United States Patent [19]

Ludt et al.

[11] 3,781,660
[45] Dec. 25, 1973

[54] CONDUCTIVITY METER FOR MEASURING DISTILLATE HYDROCARBON FUELS

[75] Inventors: William C. Ludt, Yonkers; Eugene H. Lombardi, Port Chester, both of N.Y.

[73] Assignee: Ethyl Corporation, Richmond, Va.

[22] Filed: May 11, 1972

[21] Appl. No.: 252,473

[52] U.S. Cl............................ 324/30 R, 324/30 B
[51] Int. Cl...................... G01r 27/22, G01r 27/24
[58] Field of Search ........... 324/30 R, 30 B, 123 R, 324/115; 330/23

[56] References Cited
UNITED STATES PATENTS

| | | | |
|---|---|---|---|
| 3,090,916 | 5/1963 | Gill | 324/115 |
| 3,047,797 | 7/1962 | Borsboom | 324/30 R |
| 3,028,473 | 4/1962 | Dyer | 330/23 |
| 3,652,934 | 3/1972 | Paljug et al. | 324/123 R |

FOREIGN PATENTS OR APPLICATIONS

| | | | |
|---|---|---|---|
| 1,054,357 | 1/1967 | Great Britain | 324/30 B |

OTHER PUBLICATIONS

Heathkit Assembly Manual, Utility Solid–State Voltmeter Model IM-17, Heath Company, 1967, pgs. 22 and 31.

*Primary Examiner*—Rudolph V. Rolinec
*Assistant Examiner*—Rolf Hille
*Attorney*—Donald L. Johnson et al.

[57] ABSTRACT

Disclosed herein is a conductivity meter adapted for use in measuring the conductivity of distillate hydrocarbon fuels, comprising a conductivity probe, a direct current power source (e.g., nickel cadmium battery), an amplifier, and an ammeter calibrated in units of conductivity (e.g., picomhos per meter). The conductivity probe comprises two series of closely spaced plates of high surface area. The amplifier is of the high gain high input impedance (FET) operational type. The amplifier and battery are contained in a thermally insulated housing having a self-contained heating unit and heat sink.

8 Claims, 2 Drawing Figures

PATENTED DEC 25 1973  3,781,660

CONDUCTIVITY METER FOR MEASURING DISTILLATE HYDROCARBON FUELS

BACKGROUND

Electrical conductivity of distillate hydrocarbon fuels is extremely low. Such low conductivity leads to buildup of static charge in the fuel during transit in pipelines or, for that matter, in any transfer operation. Such static charges present fire and explosion hazards.

Additives are available to increase the conductivity of fuels. Such additives are relatively expensive and cannot be used in excessive amounts. A need exists for a conductivity meter which is capable of measuring the very low conductance values of hydrocarbon fuels. With such a meter the presence of a potential hazard can be recognized before it becomes actual. The potential hazard can be alleviated by appropriate measures such as the addition of conductivity additives.

SUMMARY

The present invention provides a conductivity meter especially adapted to measure the very low conductivity values of distillate hydrocarbon fuels. The meter comprises a conductivity probe containing closely spaced plates connected to different electrical conductors. The plates provide a high surface area. A direct current source applies a voltage across the plates. Any resulting current flow is proportional to conductance. The signal provided by such current flow is amplified by a high gain high input impedance (FET) operational amplifier and the amplified output read on a high sensitivity ammeter calibrated to read conductivity units.

The direct current power source and operational amplifier are contained in a thermally insulated housing which has a self-contained thermostatically-controlled heater and heat sink. This allows the portable use of the meter under adverse weather conditions without substantial temperature effects on the accuracy of the masurement.

DESCRIPTION OF THE PREFERRED EMBODIMENTS

Figure 1:
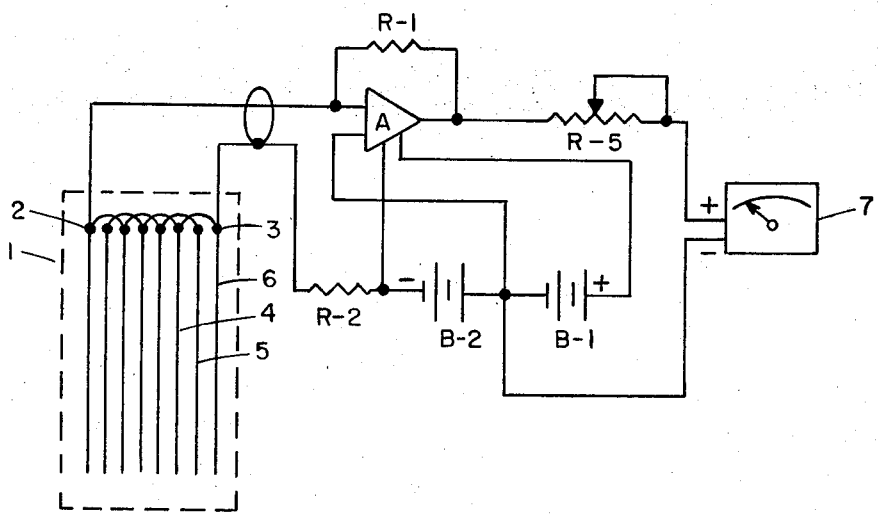
FIG. 1 is a schematic circuit diagram of the basic system.

Referring to FIG. 1, the meter comprises a conductivity probe generally indicated by 1. The probe contains two series, 2 and 3, of electrically connected metal plates 4. Adjacent plates 4 and 5 are each members of a different one of the two series, 3 and 2, of electrically connected metal plates. Thus, every other plate (e.g., 4 and 6) are members of the same series of electrically connected metal plates. The metal plates are closely spaced but not in electrical contact, such that the liquid being measured can fill the spaces between the plates. Good results are obtained when the plates are spaced about 0.01–0.075 inch apart.

An important feature of the invention is the high surface area of the plates in the probe compared to other related probes. In probe 1, the total surface area of each of said series of plates, taking into account both surfaces of the plate, is at least about 30 square inches.

A 6-volt nickel-cadmium battery B-2 applies a voltage across the two series of metal plates. Included in the circuit to one of the series of metal plates 3 is resistor R-2 (one megohm). Resistor R-2 limits the short circuit current in the probe to 6 $\mu$a to prevent sparking. The other series of metal plates 2 is connected to the input of operational amplifier A. This amplifier is a field effect transistor input (FET) operational amplifier provided with a pico-amp offset current and is operable at ±6 volts. Suitable high gain high input impedance solid state operational amplifiers are available commercially. One such device is supplied by Analog Devices as Part No. AD 503-KH. Amplifier A is provided with a negative feedback loop through R-1 (effectively 40 megohms). The output is connected through a variable resistor R-5 to ammeter 7. Ammeter 7 is calibrated to read conductance in terms of conductance units (CU). One CU is defined as one picomho per meter.

In operation, conductivity probe 1 is immersed in the distillate hydrocarbon fuel whose conductivity is to be measured. The fuel enters the probe and fills the space between the metal plates. Due to the voltage difference between the plates and assuming some conductivity of the fuel, a small current flows between adjacent plates. The signal provided by this current is fed by a coaxial cable to high gain operational amplifier A. The current signal is amplified and fed to ammeter 7 through variable resistor R-5, which functions as a scale range adjustment for ammeter 7. Ammeter 7 reads the amplified signal which by proper calibration is a measurement of the conductivity of the distillate fuel in which the probe is immersed.

Figure 2:
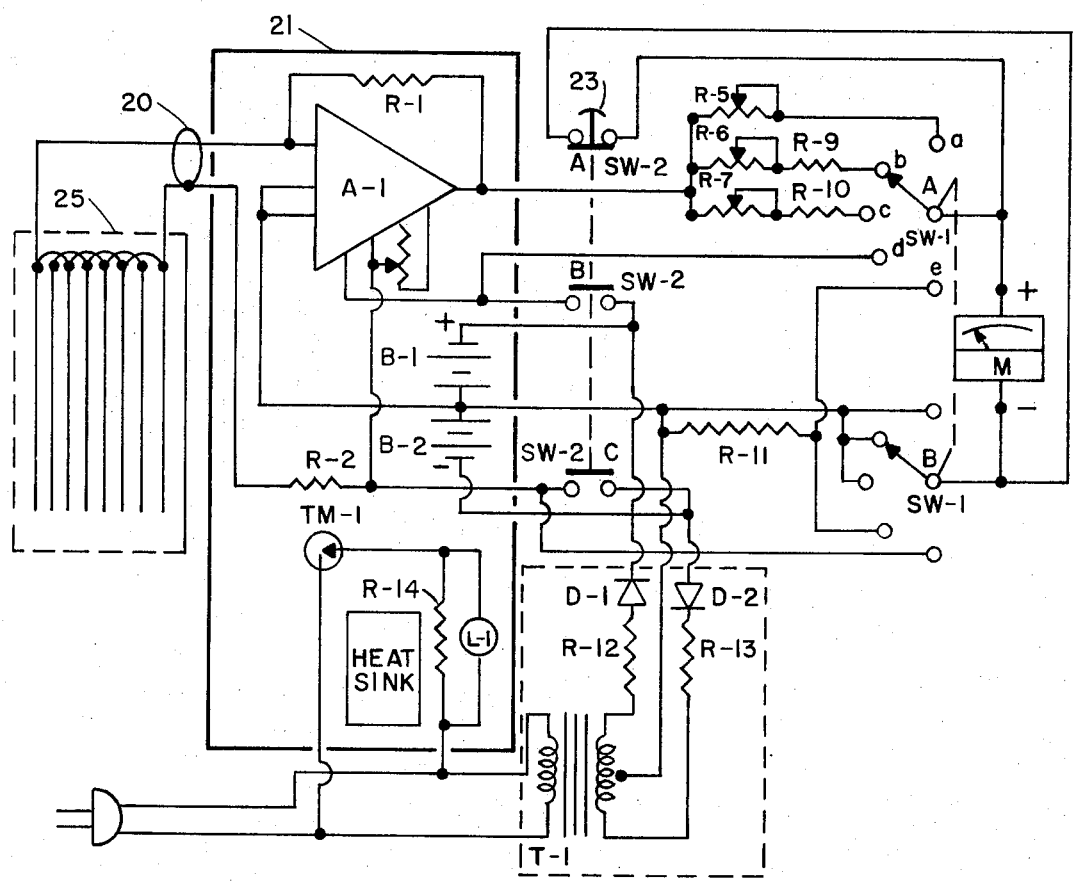
FIG. 2 is a circuit diagram of a more complex embodiment of the meter.

Referring to FIG. 2, conductivity probe 25 is connected by coaxial cable 20 to 6-volt nickel-cadmium battery B-2 and operational amplifier A-1 located within thermally insulated housing 21. Also located within housing 21 is 6-volt nickel-cadmium battery B-1 which in cooperation with battery B-2 supplies power to operational amplifier A-1. The output of amplifier A-1 is connected through three parallel variable resistors, R-5, R-6 and R-7, to terminals a, b and c of two pole five-position rotary switch SW-1. Pole A of switch SW-1 is shown connecting terminal b to ammeter M and through pole B of switch SW-1 to the common terminal between batteries B-1 and B-2.

Also shown is center taped transformer T-1 connected through diodes D-1 and D-2 to batteries B-1 and B-2.

Located within housing 21 is resistive heater R-14 connected to a 110-volt AC power source through thermostat TM-1. Neon pilot light L-1 is mounted outside housing 21 and is connected in parallel with heater R-14. Located in proximity to heater R-14 is a mass of heat sink material which absorbs heat emitted by heater R-14 and releases it over a period of time. The heat sink material shown in brass, although alternative materials may be used such as lead, aluminum, copper, Glauber salts, or any dense material with a high specific heat factor.

Three pole switch SW-2 is push-button operated. When button 23 is pushed, poles B and C of switch SW-2 close and connect battery B-1 to amplifier A-1 and to battery test terminal d of switch SW-1. Pole C of switch SW-2 also closes connecting battery B-2 through resistor R-2 and coaxial cable 20 to one of the series of connected metal plates in conductivity probe 1. Pole C of SW-2 also connects battery B-2 to amplifier A-1 and to battery test terminal e of switch section B, SW-1.

A shunt circuit is shown connecting the terminals of ammeter M through pole A of switch SW-2. When button 23 is pushed, pole A of switch SW-2 opens, removing the shunt and making ammeter M operational.

In operation, probe 1 is placed in the distillate fuel to be measured. Depression of button 23 opens pole A and closes poles B and C of switch SW-2. Battery B-1 applies a potential across the two series of metal plates in probe 1, inducing a small current flow in coaxial cable 20 which serves as an input signal to operational amplifier A-1. Amplifier A-1, powered by battery B-1 and B-2, amplifies the small input current signal and feeds the amplified signal through one of three parallel variable resistors, R-5, R-6 or R-7, to ammeter M. These resistors function to provide three scale ranges in ammeter M. These resistors are suitably 10-K trimpots. In order to provide the higher scale ranges, R-6 and R-7 have fixed resistors, R-9 and R-10, connected in series. These are suitably 39-K and 89-K, respectively.

Ammeter M responds to the amplified current flow and reads the conductance of the test liquid in arbitrary conductance units (CU). These are defined in picomhos per meter. If ammeter M reads at the bottom of the scale, greater sensitivity can be obtained by changing switch SW-1 to terminal a position. Likewise, if ammeter M goes off scale on the high end, changing switch SW-1 to terminal c will provide scale. An appropriate scale factor must be applied depending upon the resistor values placed in the circuit selected by switch SW-1.

Batteries B-1 and B-2 can be tested by turning switch SW-1 to the d and e positions and depressing button 23. This completes a circuit through resistance load R-11 (suitably 120-K) and the condition of the battery is proportional to the current flow through ammeter M.

When the batteries are weak they can be recharged by connecting transformer T-1 to a 110-volt AC power source. The broken line enclosing transformer T-1 designates the battery charger section of the unit. Resistors R-12 and R-13 (suitably 150 ohm) serve to limit the current applied to the batteries, and diodes D-1 and D-2 function as rectifiers.

While recharging, it is also convenient to heat the contents of thermally insulated housing 21 to close to the maximum operating temperature of amplifier A-1. A quantity of this heat is retained in a mass of heat sink material located in the housing near the electrical heater. This serves to stabilize the temperature inside the housing and thus improves instrument accuracy when the unit is used in the field without electrical heat in cold weather.

Standardization is provided with external precision resistors plugged into suitable jacks on the end of the probe. The precision resistors are chosen to standardize scale calibration on low reading scale at 25 CU and at the two higher scales at 500 CU.

A key feature of the conductivity meter is the enclosure of the amplifier and batteries in heated insulated compartment separate from the probe. This allows use of the instrument during cold weather when other types of instruments are not usable. Certain previous units adapted to measure conductivity of water have their amplifier located in the probe which is immersed in the liquid. Water doesn't readily cool below 32°F. but distillate fuel does. By placing the amplifier in a separate compartment this low temperature problem is overcome.

We claim:

1. A conductivity meter especially adapted to measure the conductivity of distillate hydrocarbon fuels, said meter comprising
   A. a conductivity probe comprising two series of electrically connected conductive plates, said series of plates being positioned such that the plates of one of said series are proximate to but electrically separated from the plates of the other of said series of plates such that the liquid being measured fills the space between said plates and the total surface area of each of said series of plates being at least about 30 square inches;
   B. a direct current voltage source operatively connected to supply a voltage difference between each of said series of plates;
   C. a field effect transistor input operational amplifier provided with a pico-amp offset current operatively connected to amplify the signal produced when electrical current flows from one of said series of plates to the other of said series of plates; and
   D. an ammeter connected to the output of said amplifier and adapted to respond to the output signal of said amplifier.

2. The meter of claim 1 wherein said direct current voltage source comprises a nickel-cadmium battery.

3. The meter of claim 2 further characterized by inclusion of a thermally insulated housing, said battery and said amplifier being contained within said housing.

4. The meter of claim 3 further characterized by inclusion of electrical heating means within said housing and a mass of heat sink material, said heating means being adapted to heat said heat sink material such that the temperature within said housing remains substantially stable for an extended period during use of said meter in an environment of changing temperature.

5. The meter of claim 4 further characterized by having a plurality of adjustable resistors connected in parallel in the output signal circuit from said amplifier and a range selector switch adapted to include any one at a time of said plurality of adjustable resistors in the output signal connection of said amplifier to said ammeter.

6. The meter of claim 5 further characterized by inclusion of a shunt circuit between the terminals of said ammeter and a shunt switch in said shunt circuit.

7. The meter of claim 6 further characterized by inclusion of a power switch in the connection of said direct current power source adapted to disconnect said power source when said conductivity meter is not in use.

8. The meter of claim 7 further characterized by inclusion of means for interlocking said power switch and said shunt switch such that one switch is closed when the other is open.

* * * * *